Feb. 10, 1970 D. V. SIM 3,494,228
SAW CHAIN FILING APPARATUS
Filed May 6, 1968 2 Sheets-Sheet 1
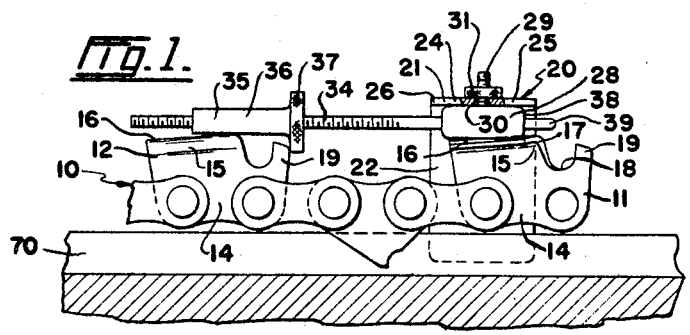
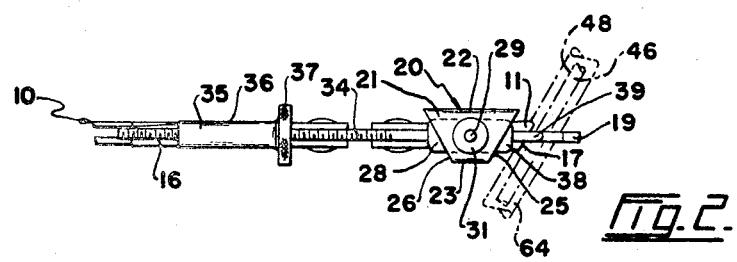
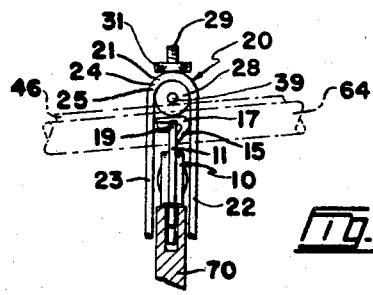
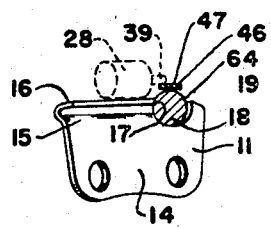
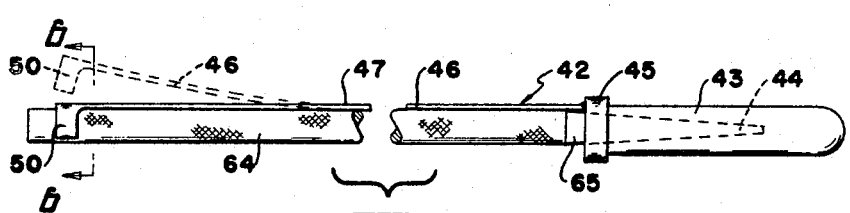
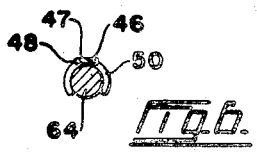
INVENTOR
DONALD V. SIM
BY
*Fetherstonhaugh & Co.*
ATTORNEYS

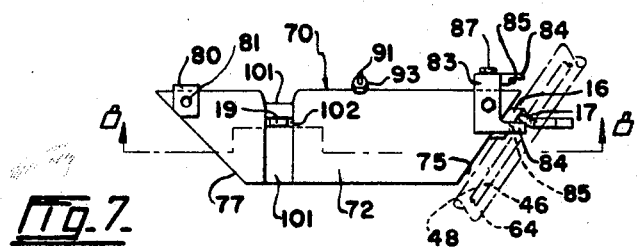
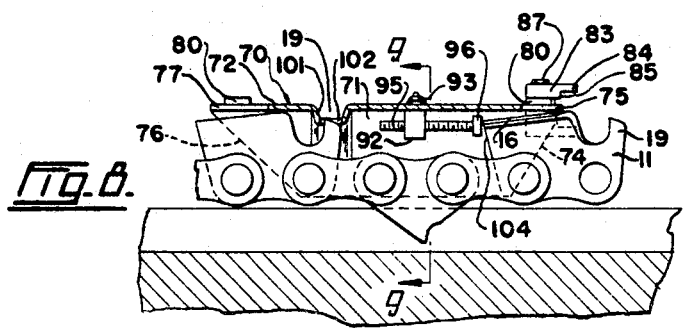
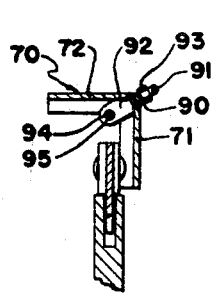
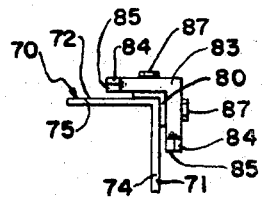

United States Patent Office 3,494,228
Patented Feb. 10, 1970

3,494,228
SAW CHAIN FILING APPARATUS
Donald V. Sim, 22292 20th Road, Haney,
British Columbia, Canada
Filed May 6, 1968, Ser. No. 726,958
Int. Cl. B23d 63/08, 63/00
U.S. Cl. 76—36                                    10 Claims

ABSTRACT OF THE DISCLOSURE

Apparatus including a file guide attachable to a saw chain and a file holder which co-operates with the file guide to enable teeth of a saw chain to be precision filed by hand.

BACKGROUND OF THE INVENTION

This invention relates to apparatus for aiding a saw filer engaged in sharpening the cutting teeth of a chain saw.

There are a number of file guides available which are intended to assist a filer to work quickly and accurately. Such guides can be classified generally as either contact or sight guides and both have serious disadvantages which many experienced saw filers feel considerably outweigh their advantages.

A contact guide usually provides a channel or the like in which the sharpening file is moved to remove metal from a cutting edge of a tooth. In order to withstand the abrading action of the file, the channel must be of metal which normally is hardened and such a guiding surface causes a file to slide in a manner which robs the filer of at least some of the sensation of actually cutting into metal. Once a filer loses the "feel" of his file, he is apt to remove too much metal and is almost certain to lose a great deal of the accuracy which is so important in the filing of saw chain teeth.

In the case of a sight guide, such a device merely provides a line of sight along which the filer is required to move the file during sharpening. This helps to some extent in maintaining the file at the correct angle relative to the saw chain but is of little assistance in controlling the vertical movement of the file. When a file is too high, excess metal is removed from the top edge of a cutter tooth, resulting in a tooth cutting edge which slopes back so that the tooth is blunt and slow cutting. Should the file be held too low, this results in a cutting edge which is thinned down and hooked in such a manner that it becomes dull after only a very short period of use.

SUMMARY OF THE INVENTION

The present saw chain filing apparatus overcomes the above mentioned disadvantages of conventional file guides by providing apparatus which positively controls the vertical movement of the file. Once the apparatus is adjusted to a particular cutter tooth and is properly supported during filing to sharpen that tooth, the file cannot remove metal from the cutting edge of the tooth either above or below the level specified by the manufacturer. The apparatus ensures that the filer retains the "feel" of his file at all times and can use his sense of touch as well as his sense of sight to determine when the saw chain cutter teeth have been properly sharpened. An adjustable stop is provided on the apparatus which can be set to control lateral movement of the file so that no more than a predetermined amount of metal is removed from the cutting edge of the tooth. The apparatus is of extremely simple construction which makes it economical to manufacture and convenient to carry on the person of the user who often is required to sharpen a chain saw being used in a remote area.

BRIEF DESCRIPTION OF THE DRAWINGS

FIGURE 1 is a part longitudinal section and part side elevational view of the apparatus in position of use on a saw chain, FIGURE 2 is a top plan view of the structure shown in FIGURE 1, FIGURE 3 is a front elevation of the same structure, FIGURE 4 is a perspective view illustrating the correct position of a sharpening file on a cutter tooth, FIGURE 5 is a side elevation, partly broken away, of a sharpening file fitted to the file holder, FIGURE 6 is a detail section taken on the line 6—6 of FIGURE 5, FIGURE 7 is a plan of another embodiment of the file guide, FIGURE 8 is a longitudinal section taken on the line 8—8 of FIGURE 7, FIGURE 9 is a sectional view taken on the line 9—9 of FIGURE 8, and FIGURE 10 is a front elevation of the guide.

DESCRIPTION OF THE PREFERRED EMBODIMENT

The present apparatus is intended for use in sharpening a saw chain such as is indicated generally by the numeral 10. There are a number of types of saw chain manufactured, the one illustrated in the drawing and shown best in FIGURE 1 being typical and comprising an endless chain formed of connected links including left cutter teeth 11 and right cutter teeth 12. The cutters 11 and 12 have flat link portions 14, reversely curved side portions 15, and top flanges 16. Single or continuous hollow ground cutting edges 17 are formed on the leading edges of the flanges 16 and the side portions 15, the cutting edges extending down to the top edges 18 of the link portions 14. Spaced forwardly of the edges 17 are depth gauges or runners 19 which project outwardly from, and are integrally formed with, the link portions 14.

The saw chain 10 normally is sharpened manually and the present apparatus, which is designed to aid such sharpening, includes a file guide generally indicated by the numeral 20. Guide 20 has an inverted U-shaped body 21 consisting of parallel side walls 22 and 23 and a rounded top wall 24. Side wall 23 is considerably narrower than the side wall 22 and the end edges 25 and 26 of the body are disposed at opposite angles to the side walls of the body 21.

Housed within the body 21 is a substantially cylindrical block 28 fitted with a vertically disposed and centrally located stem 29. Stem 29 extends upwardly through an opening 30 in the top wall 24 and the outer end of said stem is threaded to receive a knurled nut 31. The block 28 carries a longitudinally extending bolt 34 which is fitted with an adjustable stop 35, the stop preferably being an internally threaded sleeve 36 provided with a knurled flange 37. The opposite end of the block 28 projects beyond the body edge 25 to provide a vertical guiding member 38. A horizontal guiding member 39 projects beyond the member 38, this member preferably being a short pin or the like.

The present apparatus includes a file holder generally indicated by the numeral 42, in FIGURE 5. Holder 42 comprises a handle 43 in which a tapered socket 44 is formed. A ferrule 45 is secured to one end of the handle 43 and, suitably secured to this ferrule, is a slide bar 46. Slide bar 46 is a flat strip of metal which is rectangular in cross section and has a top edge 47 and a side edge 48. The bar 46 is curved upwardly towards its free end and integrally formed on said free end is a spring clip 50. Clip 50 is an inverted U-shaped member which projects laterally beyond the sides of the slide bar 46.

Most saw chains are adapted to be sharpened by means of a ¼ inch round file such as is indicated by the numeral 64 although files of other cross sectional shape are sometimes used. Such a file has a tapered tang 65 which can be inserted into the correspondingly tapered socket 44 of the file holder handle. When the file tang is so inserted and the opposite end of the bar 46 is forced downwardly so as to snap the clip 50 around the end of the file, said slide bar is pressed firmly into contact with the top edge of the file so that the edges 47 and 48 extend parallel to the longitudinal axis of said file.

To sharpen a left cutter tooth 11 for example, the guide 20 is placed on the saw chain 10 which is supported, under suitable tension, on the cutter bar 70 of the chain saw during sharpening. Body 11 straddles the tooth with the side walls 22 and 23 extending vertically downwards and the block 28 resting on the top flange 16. The stop 35 is then adjusted lengthwise of the bolt 34 until the flange 37 bears against a suitable part of the chain, i.e. against an adjacent runner 19. By holding the guide 20 firmly and carefully adjusting the stop 35, the vertical guiding edge 38 is positioned a selected distance to the left or rearwardly of the cutting edge 17. At this time, the horizontal guiding member 39 will project beyond the cutting edge 17 so as to overhang said edge. The file 64 with the holder 42 attached thereto is then entered beneath the member 39 and sharpening can commence.

Referring now to FIGURE 4, it will be noticed the top of the file projects a short distance above the cutting edge 17, this distance being approximately ⅕ of the file diameter. Chain saw manufacturers specify that the file project this distance in order to provide the cutting edge of the tooth with the correct undercut using a ¼ inch full round file. It will be noted, the distance from the underside of the member 39 to the top of the edge 18 is equal to the diameter of the file plus the thickness of the guide bar 46. Thus, the file is correctly positioned vertically when the top edge 47 of the guide bar engages the underside of the horizontal guiding member 39.

In FIGURE 2, it will be noted the edges 25 and 26 of the guide body 21 are disposed at acute angles to the longitudinal axes of the guide 20 and the chain 10. This particular angle is approximately 35° which enables the filer to use the edge 25 as a sight guide and by keeping the slide bar edge 48 parallel to this angularly disposed edge of the body 21, he is able to maintain the file at the correct cutting angle.

The sharpening file 64 is required to be held at approximately 5° to the horizontal, as shown in FIGURE 3, with the handle 43 lower than the clip 50. If desired, suitable index marks, not shown, can be inscribed on the holder 42 to assist the filer in achieving this 5° tilt.

With the file supported as above described, and the guide 20 firmly clamped to the saw chain, the cutter tooth can be sharpened. During sharpening, the filer maintains the several angular positions of the file and at the same time, exerts a slight upward pressure on said file so that the edge 47 of the slide bar is in sliding contact with the underside of the guiding member 39. The file 64 is thus guided by the apparatus to sharpen the tooth at the correct angles and to do so without cutting too low or too high. As filing progresses, the filer retains the sensation of cutting into the metal of the tooth and, with a little experience, he is able to tell almost by feel alone when the tooth is sharp. However, if the filer is not warned to stop filing by the cutting action of the file, the side edge 48 of the slide bar will engage a rounded corner of the vertical grinding edge 38 to indicate that filing should be halted before excess metal is removed from the cutting edge of the tooth.

All the left cutter teeth of the saw chain 10 are sharpened as above described, after which the right cutters can be sharpened. To prepare the apparatus for sharpening the right cutter teeth, the nut 31 is backed off the stem 29 and the body 21 is removed from the block 28. The body is then rotated through 180° about a vertical axis so that the positions of the edges 25 and 26 are reversed, whereupon the several parts of the apparatus are reassembled. The apparatus can then be operated as described to sharpen the right cutter teeth without the filer being required to shift his position to the opposite side of the cutter bar 70 or attempting to file in a manner which he would find awkward.

From the foregoing, it will be appreciated that the apparatus provides an extremely useful sharpening aid which will enable a filer with even limited filing experience to sharpen a chain saw with speed and precision.

Referring to the embodiment shown in FIGURES 7, 8 and 9, the numeral 70 indicates generally a file guide which is formed of a length of angle to provide right angularly disposed side flanges 71 and 72. At one end of guide 70, the flanges 71 and 72 have edges 74 and 75 which are bevelled at an angle of 30°. At the opposite end of guide 70, the flanges 71 and 72 have edges 76 and 77 which are bevelled at an angle of 45°.

Secured to each end of the guide 70, is a right angular boss 80 having a pair of threaded openings 81, there being one opening perpendicular to each flange of said guide. These bosses 80 are adapted to be fitted alternatively with a right angular block 83 having two horizontal guiding members 84 and two vertical guiding members 85. Block 83 is secured to the guide by bolts 87 which enter the openings 81 and position said block so that the members 84 and 95 overhang bevelled ends of the side flanges 71 and 72.

At about the centre of guide 70, and at the junction of the flanges 71 and 72, an opening 90 is provided to receive a bolt 91 having a head 92 and being fitted with a nut 93. Head 92 has a opening 94 in which a bolt 95 is mounted, this longitudinally extending bolt having a head. The adjustable bolt 95 is the equivalent of stop 35 of the earlier described embodiment in that it serves as a means for spacing the vertical guiding members 85 a selected distance from the cutting edge of the saw chain tooth as will be described later.

Side flanges 71 and 72 of the file guide are each provided with a transverse recess 101. The bottom walls of these recesses each have a longitudinal slot 102.

In use, the file guide 70 is placed on the saw chain and as shown in FIGURE 8, assuming it is the left cutter 11 which is to be sharpened. Flange 72 bears on the top flange 16 of the cutter teeth while the flange 71 is held so as to engage a side of the saw chain. Bolt 95 is adjusted lengthwise by trial and error to position the head 96 so it will abut the trailing edge 104 of the tooth with the edge 75 spaced a suitable distance to the rear of the cutting edge 17 of the tooth. This adjustment also places the vertical guiding member 84 in the correct position relative to the edge 17. At this time, the tip of a runner 19 projects upwardly through the slot 102 in the flange 72.

The filer grips the guide 70 firmly in his left hand so as to clamp it in this adjusted position on the saw chain and starts the sharpening operation. File 64 is placed against the cutting edge 17 and the slide bar 46 is placed in sliding contact with the guiding member 84 of the flange 82. At this time, the bar 46 is held parallel to the bevelled edge 75 which will place the file at the correct 35° cutting angle. Also, the file is tilted, handle end low, to dispose the sharpening tool at the required 5° angle to the horizontal.

With the file thus positioned and while a slight upward pressure is maintained to keep the slide bar 46 in firm sliding contact with the guiding member 84, the tool is moved back and forth to sharpen the cutting edge 17. The filer can feel the file as it moves through its cutting stroke and normally knows from experience when sufficient metal has been removed. If the filer misjudges and attempts to remove too much metal, the side edge 48 of the slide bar will engage the vertical guiding member 85 of the flange 72 to halt further lateral movement of the file before excess metal can be removed from the cutter tooth.

Once the first left cutter 11 has been sharpened, the filer raises the guide 70 slightly and rotates it through 90° so that flange 72 can be placed against the side of the chain nearest to him and the flange 71 can rest on top of the saw chain. The guide 70 is then moved along to the next right cutter 12 whereupon, with the two flanges in their new positions, the head 96 of the adjusting bolt is placed in contact with the trailing edge 104 of the tooth to be sharpened, the cutting edge 17 of this tooth is then filed to sharpen it in the same manner as the left cutter. Thus, the file guide is moved along the saw chain and is positioned alternatively to sharpen left and right teeth. In each case, when the adjusting bolt 95 is held firmly against the rear of trailing edge 104 of the tooth, the guide block 83 is correctly positioned to ensure that the teeth are sharpened in the manner specified by the chain saw manufacturers. Also, the same amount of metal is removed from each tooth and all teeth then are of the same length which is extremely important if the chain saw is to operate properly. The saw chain can be sharpened in one continuous operation and from one side of the chain saw which considerably reduces the time required to carry out the sharpening operation.

Whenever it becomes necessary to reduce the height of the runners 19, the file guide 70 is suitably positioned on the saw chain and a flat file is entered into a recess 101 to remove the required amount of metal from the tip of a runner which then projects upwardly through the slot 102 of that recess as shown in FIGURE 8. The runners 19 can be filed without repositioning the guide 70 to reduce further the time needed to restore the saw chain to proper working order.

In some instances, it is desirable to sharpen the teeth of a particular chain saw so that their cutting edges are disposed at a 45° angle to the longitudinal axis of the chain. The saw guide 70 can be used for this purpose and is converted by removing the block 83 from the 35° end of the guide and mounting it on the 45° end thereof. Nut 93 is then removed from the bolt 91 and the bolt is taken out of the guide and is reversed or turned end for end. When the bolt 91 is re-inserted through the opening 90 and is refitted with the nut 93, the head 96 of the adjusting bolt projects towards the 45° end of the guide and can then be adjusted as required to bear against a suitable part of the saw chain. The cutting edges of the teeth can then be sharpened to the desired 45° angle using the present tool converted for this purpose.

I claim:
1. Saw chain filing apparatus comprising a file guide adapted to be placed on a saw chain to engage a tooth having a cutting edge, said file guide having a horizontal guiding member overhanging the cutting edge, a file holder adapted to be attached to a tooth sharpening file, said file holder having a slide bar extending parallel to the longitudinal axis of the file adjacent the top edge of said file, said slide bar having sliding contact with the underside of the horizontal guiding member as the file is moved to sharpen the cutting edge of the saw chain tooth.

2. Saw chain filing apparatus as claimed in claim 1, and including a vertical guiding member on said file guide, said slide bar having a side edge adapted to slidably engage the vertical guiding member during sharpening.

3. Saw chain filing apparatus as claimed in claim 2, and including means for spacing the vertical guiding member a selected distance from the cutting edge of the saw chain tooth.

4. Saw chain filing apparatus as claimed in claim 3, in which said file giude has a body which extends over the saw chain, said body having end edges disposed at opposite angles relative to the longitudinal axis of the saw chain whereby to conform substantially to the cutting angles of right and left teeth of the saw chain, said horizontal and vertical guiding members being part of a block carried by the body, and means for removably securing the block to the body.

5. Saw chain apparatus as claimed in claim 1, in which said file holder has a file supporting handle at one end of said slide bar, and a file gripping spring clip at the opposite end of said slide bar, said slide bar being vertically flexible and normally curved upwardly towards said opposite end; said handle and spring clip, when secured to opposite ends of the file, flexing the slide bar into parallel and close fitting engagement with the top of the file.

6. Saw chain apparatus as claimed in claim 5, in which said slide bar has a top edge and a side edge disposed at right angles to one another and extending parallel to the longitudinal axis of the file.

7. Saw chain apparatus comprising a file guide adapted to be placed on a saw chain to engage a tooth having a cutting edge, said file guide having a horizontal guiding member and a vertical guiding member at one end edge thereof, a longitudinally extending bolt at the opposite end of the file guide, an adjustable stop carried by the bolt to engage a saw chain part and position the file guide longitudinally of the saw chain, a file holder adapted to be attached to a tooth sharpening file, said file holder having a slide bar extending parallel to the longitudinal axis of the file along the top edge of said file, said slide bar having a top edge and a side edge which slidably engage the horizontal guiding member and the vertical guiding member, respectively, as the file is moved to sharpen the cutting edge of the saw chain tooth.

8. A guide for the use in guiding a file during the sharpening of cutting edges of left and right teeth of a saw chain and comprising right angularly disposed side flanges, said side flanges having adjacent end edges bevelled to conform substantialy to the cutting edges of the left and right teeth, a guide block secured to the file guide and including horizontal and vertical guiding members overhanging the adjacent end edges, and means for adjusting the position of the file guide on the saw chain to space the vertical guiding member a selected distance from the cutting edges of the teeth.

9. A guide as claimed in claim 8, in which said side flanges have opposite end edges bevelled at different angles, and said guide bock being removably mounted on the file guide to be selectively positioned at either end thereof.

10. A guide as claimed in claim 8, in which the means for adjusting the position of the file guide on the saw chain comprises a longitudinally extending adjusting bolt, a nut mounted on the file guide between the side flanges to receive the adjusting bolt, said nut being removably secured to the file guide to allow the bolt to be positioned projecting towards either end of the file guide.

References Cited

UNITED STATES PATENTS

| 3,023,646 | 3/1962 | Travis | 76—31 |
| 3,093,016 | 6/1963 | Spence | 76—36 |
| 3,327,567 | 6/1967 | Penberthy | 76—36 |

BERNARD STICKNEY, Primary Examiner

U.S. Cl. X.R.

76—25